United States Patent
Yanko (10) Patent No.: US 8,955,007 B2
(45) Date of Patent: Feb. 10, 2015

(54) SYSTEM FOR AND METHOD OF PROVIDING SUBSCRIBER VOTING INTERACTION

(75) Inventor: Jay S. Yanko, Wauwatosa, WI (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 267 days.

(21) Appl. No.: 12/965,284

(22) Filed: Dec. 10, 2010

(65) Prior Publication Data

US 2012/0151516 A1 Jun. 14, 2012

(51) Int. Cl.
*H04N 7/173* (2011.01)
*H04N 7/16* (2011.01)
*H04N 21/475* (2011.01)
*H04H 60/33* (2008.01)
*H04H 60/66* (2008.01)
*H04N 21/258* (2011.01)
*H04N 21/4788* (2011.01)
*H04N 21/658* (2011.01)

(52) U.S. Cl.
CPC .......... *H04N 21/4758* (2013.01); *H04H 60/33* (2013.01); *H04H 60/66* (2013.01); *H04N 21/25891* (2013.01); *H04N 21/4755* (2013.01); *H04N 21/4788* (2013.01); *H04N 21/6582* (2013.01)

USPC ................................ 725/24; 725/41; 725/43

(58) Field of Classification Search
CPC .................................................. H04N 21/4758
USPC ......................................... 725/16, 37–61, 24
See application file for complete search history.

(56) References Cited

U.S. PATENT DOCUMENTS

| | | | | |
|---|---|---|---|---|
| 2003/0066072 | A1* | 4/2003 | Creed et al. | 725/10 |
| 2004/0221325 | A1* | 11/2004 | Nakajima et al. | 725/145 |
| 2006/0259923 | A1* | 11/2006 | Chiu | 725/24 |
| 2007/0186230 | A1* | 8/2007 | Foroutan | 725/24 |
| 2008/0196071 | A1* | 8/2008 | Manthoulis | 725/100 |
| 2009/0007167 | A1* | 1/2009 | Artom | 725/9 |
| 2010/0008643 | A1* | 1/2010 | Rakib et al. | 386/68 |
| 2011/0247044 | A1* | 10/2011 | Jacoby | 725/115 |
| 2013/0244708 | A1* | 9/2013 | Andrus et al. | 455/466 |

* cited by examiner

*Primary Examiner* — Benjamin R Bruckart
*Assistant Examiner* — Carmine Malangone (57) ABSTRACT

A system for and method of providing subscriber voting interaction. The system and method may include outputting program content data via a network, wherein the program content data comprises a plurality of images, receiving, from one or more of a plurality of subscriber systems, voting data that indicates a subscriber's vote for at least one of the plurality of images, aggregating the received voting data, and outputting, to the plurality of subscriber systems, the aggregated voting data via the network.

20 Claims, 6 Drawing Sheets

Subscriber Profile Information

Name: ☐

Home Address: ☐

Occupation: ☐

Gender: ☐

Types Of Voting Interaction Programs Desired:
○ Television Shows
○ Sports
○ Movies
○ Advertisements
○ News Social Networking Peer Groups Desired: ☐

[Submit]  [Exit]

SYSTEM FOR AND METHOD OF PROVIDING SUBSCRIBER VOTING INTERACTION

BACKGROUND INFORMATION

In general, large amounts of digital content (e.g., digital television programming, digital movies, electronic newspapers, electronic books) is consistently distributed to end users via various electronic devices (e.g., televisions, electronic readers). In many instances, metadata that indicates certain characteristics of digital content is distributed along with corresponding digital content. Accordingly, many digital content providers are manipulating such metadata to provide viewers with an enhanced viewing experience.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which.

DETAILED DESCRIPTION OF PREFERRED EMBODIMENTS

Currently, viewers of digital content view such content independently. That is, viewers that are remotely located from one another are unable to interact with each other (and the digital content) while watching the same digital content at the same time due to the limitations of current technology. Such independent viewing, however, adversely impacts the viewing experience.

A voting interaction system may display program content (e.g., digital television programs, digital movie programs, digital advertisement programs, digital sports programs, digital news programs) and allow subscribers (e.g., registered viewers) to interact with the program content by voting for or voting against various aspects of the program content (e.g., characters in the program content, satisfaction with the program content). In one embodiment, the voting interaction system may allow a subscriber to vote for or vote against a certain aspect of program content by pointing an input device (e.g., remote control) toward the program content and activating (e.g., clicking on) a voting button (e.g., a voting for button, a voting against button). For example, a first subscriber watching program content (e.g., an episode of Friends) may vote against a first character (e.g., Joey) in the program content using a first input device. Likewise, a second subscriber that is also watching the program content (e.g., the episode of Friends) may vote against a second character (e.g., Ross) in the program content using a second input device.

Based on the votes generated, the voting interaction system may aggregate the voting data received and output (e.g., display) the aggregated voting data to any, or a combination, of the first subscriber, the second subscriber, and any other subscriber that is registered to receive such aggregated voting data (e.g., other subscribers in a "Friends" social networking peer group).

During an initial registration stage, a viewer may register with (e.g., subscribe to) the voting interaction system by providing subscriber profile information to create a subscriber profile. Subscriber profile information may include data that indicates any, or a combination, of personal information of the subscribing viewer (e.g., first name, last name, home address, occupation, gender), types of program content in which voting interaction should be enabled (e.g., television programs, advertisement programs, movie programs, sports programs, news programs), and social networking peer groups desired. Based on the subscriber profile information received, the voting interaction system may create and store a subscriber profile and place the subscriber in one or more social networking peer groups.

In one embodiment, the voting interaction system may leverage one or more established social networking websites (e.g., Facebook.com, LinkedIn.com, Twitter.com, MySpace.com) to access a user profile (e.g., a Facebook profile) associated with a subscribing viewer. In such an embodiment, the voting interaction system may utilize the accessed user profile to create a subscriber profile for the subscribing viewer. For example, the voting interaction system may utilize an accessed user profile to determine the social networking peer groups in which a subscribing viewer should be placed.

After the initial registration stage, a subscriber may interact with displayed program content by voting for or voting against certain aspects of the program content using an input device (e.g., remote control). The subscriber may also interact with displayed program content and other subscribers (e.g., in a common social networking peer group) by providing comments about the program content using an input device (e.g., remote control). Based on the interactions of one or more subscribers (e.g., in a common social networking peer group), the voting interaction system may aggregate one or more votes and one or more comments and output (e.g., display) the aggregated data to one or more subscribers (e.g., in a common social networking peer group) during the display of the program content.

In certain embodiments, the voting interaction system may allow subscribers to vote for or against program content and provide comments about program content that may be part of a live broadcast. Based on the votes and comments received, the voting interaction system may provide aggregated data to the one or more subscribers during a live broadcast of the program content. For example, the voting interaction system may allow subscribers that are members of a common social networking peer group to vote for or against football players playing in a live broadcast of a football game while watching the football game. The voting interaction system may also allow the subscribers to provide comments about the football game. The voting interaction system may then aggregate the votes and comments received and output (e.g., display) the aggregated data to the subscribers during the live broadcast of the football game.

In certain embodiments, the voting interaction system may allow subscribers to opt-out of watching one or more advertisement programs using an input device (e.g., remote control). For example, once an advertisement program begins, a subscriber may decide to skip the advertisement program by activating (e.g., clicking on) a button on a remote control. In one embodiment, an advertisement program that is skipped may be replaced with another advertisement program. In such an embodiment, the amount of advertisement programs displayed during a commercial break may be the same amount of advertisement programs scheduled to be displayed during the commercial break. In another embodiment, an advertisement program that is skipped may not be replaced with another advertisement program. In such an embodiment, the amount of advertisement programs displayed during a commercial break may be less than the amount of advertisement programs scheduled to be displayed during the commercial break.

In certain embodiments, the voting interaction system may charge a fee (e.g., micropayment) for each advertisement program that is skipped (e.g., $0.05 per skipped advertisement program, $0.03 per skipped advertisement program). In other embodiments, the voting interaction system may charge a monthly fee to allow a subscriber to opt-out of receiving advertisement programs on a monthly basis.

The voting interaction system may provide the data associated with any interactions with program content to the providers of the program content. For example, the voting interaction system may provide the votes and comments associated with particular program content to the providers of the program content. In another example, the voting interaction system may provide the opt-outs associated with program content (e.g., advertisement programs) to the providers of the program content.

The voting interaction system may also provide the data associated with any interactions with program content to one or more third parties (e.g., a social network website, a product manufacturer, a sports league, a sports team). For example, the voting interaction system may provide the votes and comments associated with a particular advertising program to the manufacturers of a product being advertised.

Figure 1:
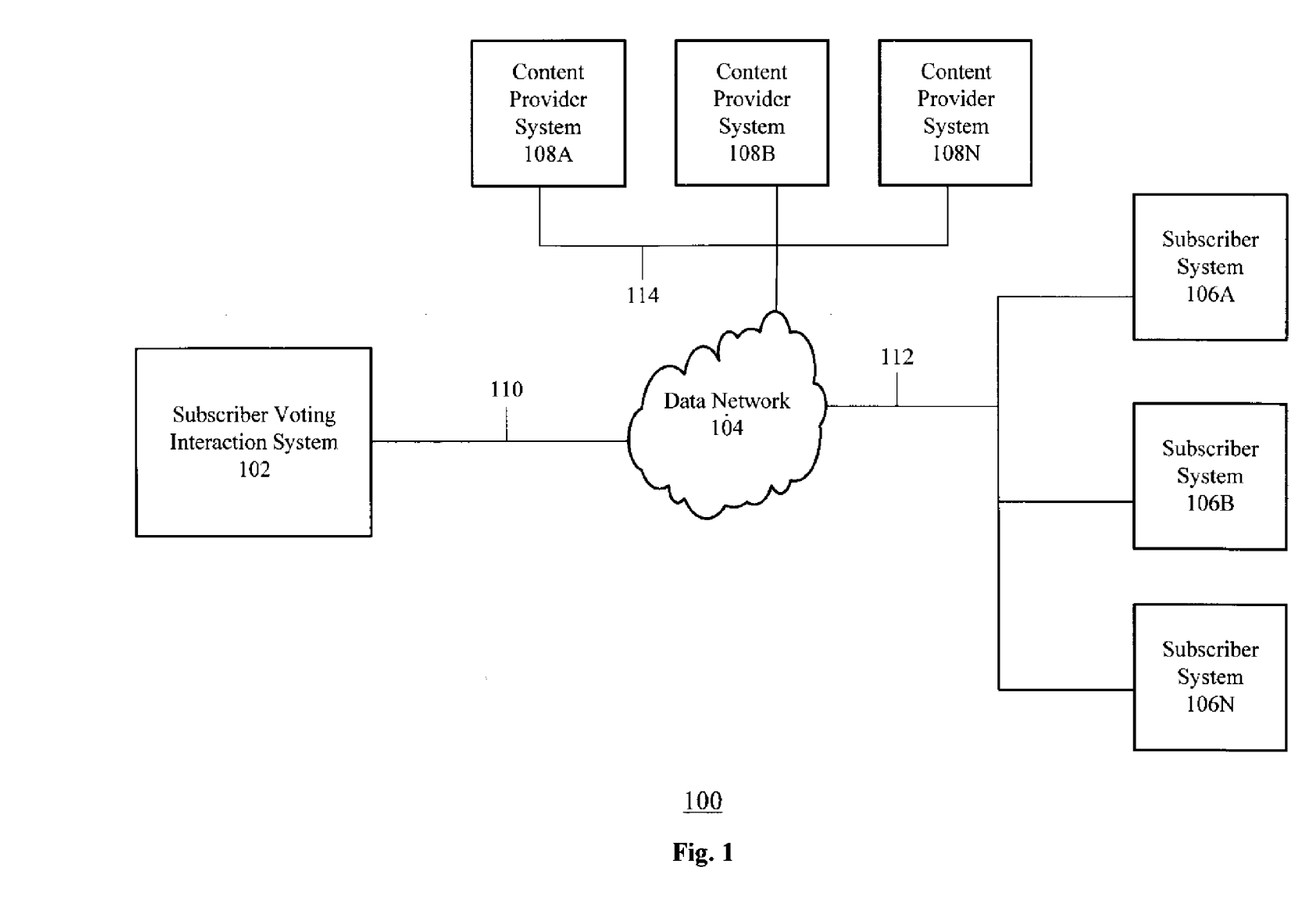
FIG. 1 is a schematic diagram illustrating a voting interaction system according to a particular embodiment.

FIG. 1 is a schematic diagram illustrating a voting interaction system according to a particular embodiment. A voting interaction system 100 may communicatively couple together any, or a combination, of a subscriber voting interaction system 102, subscriber systems 106A, 106B, 106N, and content provider system 108A, 108B, 108N using any, or a combination, of data network 104 and data paths 110, 112, 114. Accordingly, data signals may be transmitted to any of the components of the voting interaction system 100 and transmitted from any of the components of the voting interaction system 100 using any, or a combination, of data network 104 and data paths 110, 112, 114. For example, program content data signals, subscriber profile information data signals, voting data signals, comment data signals, opt-out data signals, aggregated data signals, or any other data signals may be transmitted to any of the components of the voting interaction system 100 and transmitted from any of the components of the voting interaction system 100 using any, or a combination, of data network 104 and data paths 110, 112, 114.

Data network 104 may be a wireless network, a wired network, or any combination of wireless network and wired network. For example, data network 104 may include one or more of a fiber optics network, a passive optical network, a cable network, an Internet network, a public network, a private network, a satellite network (e.g., operating in Band C, Band Ku, or Band Ka), a wireless local area network (LAN), a Global System for Mobile Communication (GSM), a Personal Communication Service (PCS), a Personal Area Network (PAN), D-AMPS, Wi-Fi, Fixed Wireless Data, IEEE 802.11a, 802.11b, 802.15.1, 802.11n and 802.11g or any other wired or wireless network for transmitting and/or receiving a data signal. In addition, data network 104 may include, without limitation, a telephone line, fiber optics, IEEE Ethernet 802.3, a wide area network (WAN), a LAN, or a global network, such as the Internet. Also, data network 104 may support, an Internet network, a wireless communication network, a cellular network, or the like, or any combination thereof. Data network 104 may further include one, or any number of the exemplary types of networks mentioned above operating as a stand-alone network or in cooperation with each other. Data network 104 may utilize one or more protocols of one or more network elements to which it is communicatively coupled. Data network 104 may translate to or from other protocols to one or more protocols of network devices. Although data network 104 is depicted as one network, it should be appreciated that according to one or more embodiments, data network 104 may comprise a plurality of interconnected networks, such as, for example, a service provider network, the Internet, a broadcaster's network, a cable television network, corporate networks, and home networks.

Subscriber voting interaction system 102, content provider systems 108A, 108B, 108N, and subscriber systems 106A, 106B, 106N may transmit data to and receive data from data network 104 representing program content data, subscriber profile information data, voting data, comment data, opt-out data, aggregated data, and other data. The data may be transmitted and received utilizing a standard telecommunications protocol or a standard networking protocol. For example, one embodiment may utilize Session Initiation Protocol (SIP). In other embodiments, the data may be transmitted, received, or a combination of both, utilizing other VoIP or messaging protocols. For example, data may also be transmitted, received, or a combination of both, using Wireless Application Protocol (WAP), Multimedia Messaging Service (MMS), Enhanced Messaging Service (EMS), Short Message Service (SMS), Global System for Mobile Communications (GSM) based systems, Code Division Multiple Access (CDMA) based systems, Transmission Control Protocol/Internet (TCP/IP) Protocols, or other protocols and systems suitable for transmitting and receiving data. Data may be transmitted and received wirelessly or may utilize cabled network or telecom connections such as: an Ethernet RJ45/Category 5 Ethernet connection, a fiber connection, a traditional phone wire-line connection, a cable connection, or other wired network connection. Data network 104 may use standard wireless protocols including IEEE 802.11a, 802.11b and 802.11g. Data network 104 may also use protocols for a wired connection, such as an IEEE Ethernet 802.3.

Subscriber systems 106A, 106B, 106N may be communicatively coupled to data network 104 via data path 112. The subscriber systems 106A, 106B, 106N may include, but are not limited to, computer devices or communications devices including, e.g., a personal computer (PC), a workstation, a PDA, a mobile device, a handheld PC, a thin system, a fat system, a network appliance, a lap top device, a set top box, a television, a VoIP device, a client system, an end-user system, or any other device that is configured to receive and display program content data, generate subscriber profile information data, voting data, comment data, and opt-out data in response to input from an input device (e.g., a remote control), transmit subscriber profile information data, voting data, comment data, and opt-out data to the subscriber voting interaction system 102 and the content provider systems 108A, 108B, 108N, and receive and display aggregated data.

Content provider systems 108A, 108B, 108N may be communicatively coupled to data network 104 via data path 114. The content provider systems 108A, 108B, 108N may include, but are not limited to, computer devices or communications devices including, e.g., a personal computer (PC), a workstation, a PDA, a mobile device, a handheld PC, a thin system, a fat system, a network appliance, a lap top device, a set top box, a television, a VoIP device, a client system, an end-user system, a server, or any other device that is configured to transmit program content data to the subscriber voting interaction system 102 and receive voting data, comment data, opt-out data, and aggregated data from the subscriber systems 106A, 106B, 106N and the subscriber voting interaction system 102.

Subscriber voting interaction system 102 may be communicatively coupled to data network 104 via data path 110. The subscriber voting interaction system 102 may include, but is not limited to, a computer device or communications device including, e.g., a personal computer (PC), a workstation, a mobile device, a thin system, a fat system, a network appliance, an Internet browser, a server, a lap top device, a VoIP device, an ATA, a video server, a Public Switched Telephone Network (PSTN) gateway, a Mobile Switching Center (MSC) gateway, or any other device that is configured to transmit program content data to the subscriber systems 106A, 106B, 106N, receive and store subscriber profile information data, voting data, comment data, and opt-out data from the subscriber systems 106A, 106B, 106N, process and aggregate voting data and comment data, and transmit aggregated data to the subscriber systems 106A, 106B, 106N and the content provider systems 108A, 108B, 108N. Details of the voting interaction system 102 are provided below.

One or more data paths disclosed herein may include any device that communicatively couples one or more devices to each other. For example, one or more data paths may include one or more networks or one or more conductive wires (e.g., copper wires). Data paths 110, 112, 114 may be unidirectional or bidirectional.

Figure 2:
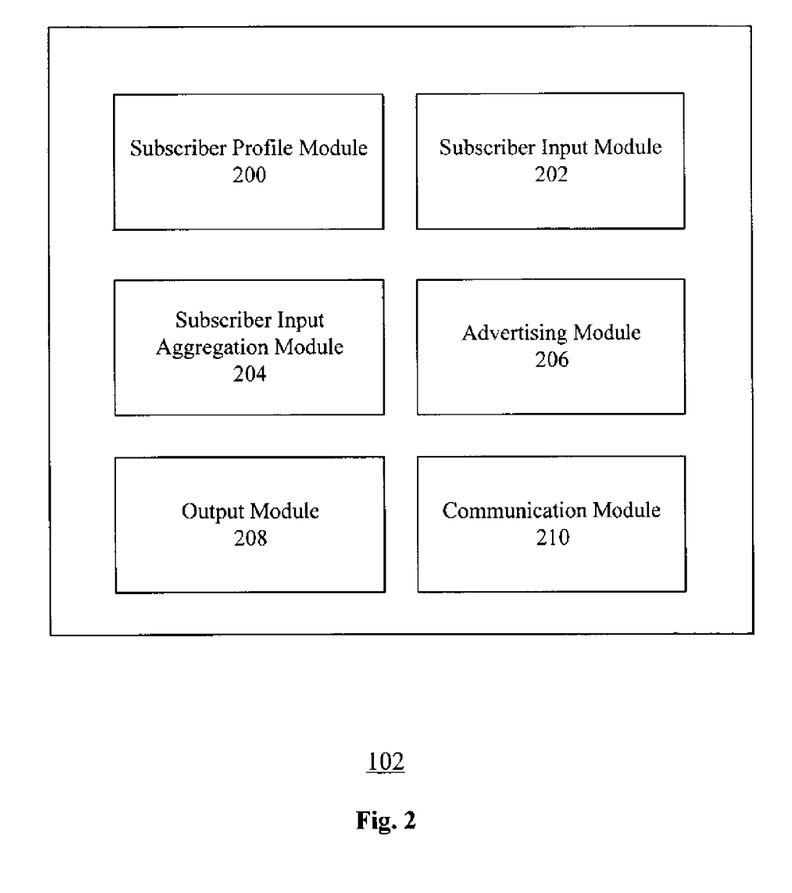
FIG. 2 is a schematic diagram of hardware components of a subscriber voting interaction system of a particular embodiment.

FIG. 2 is a schematic diagram of hardware components of a subscriber voting interaction system of a particular embodiment. The subscriber voting interaction system 102 may include a subscriber profile module 200, a subscriber input module 202, a subscriber input aggregation module 204, an advertising module 206, an output module 208, and a communication module 210. It is noted that the modules 200, 202, 204, 206, 208 and 210 are exemplary. The functions of the modules 200, 202, 204, 206, 208 and 210, may be performed at other modules remote or local to the subscriber voting interaction system 102, and the modules 200, 202, 204, 206, 208 and 210 may be combined or separated.

The communication module 210 may include computer-implemented software, hardware, or a combination of both, configured to provide communication between the subscriber voting interaction system 102 and subscriber systems 106A, 106B, 106N via data network 104 and data paths 110, 112 and between the subscriber voting interaction system 102 and content provider systems 108A, 108B, 108N via data network 104 and data paths 110, 114. In one embodiment, the communication module 210 may be configured to receive or transmit data signals to and from one or more components of the voting interaction system 100. In another embodiment, the communication module 210 may be configured to transmit the data signals or messages received from other components in the voting interaction system 100 to the other modules 200, 202, 204, 206, and 208 and may communicate data signals or messages received from the other modules 200, 202, 204, 206, and 208 to other components in the voting interaction system 100. The communication module 210 may be configured to transmit data signals and messages between the modules 200, 202, 204, 206, and 208 of the subscriber voting interaction system 102.

The subscriber profile module 200 may include computer-implemented software, hardware, of a combination of both, configured to receive subscriber profile information from subscriber systems (e.g., subscriber systems 106A, 106B, 106N). In one embodiment, the subscriber profile module 200 may receive subscriber profile information from a viewer via a subscriber system (e.g., subscriber systems 106A, 106B, 106N) during an initial registration stage.

In certain embodiments, subscriber profile information may include data that indicates any, or a combination, of personal information of the subscribing viewer (e.g., first name, last name, home address, occupation, gender), types of program content in which voting interaction should be enabled (e.g., television programs, advertisement programs, movie programs, sports programs, news programs), and social networking peer groups desired. Based on the subscriber profile information received, the subscriber profile module 200 may create and store a subscriber profile associated with the subscribing viewer and place the subscribing viewer in one or more social networking peer groups.

In one embodiment, the subscriber profile module 200 may place a subscribing viewer in a particular social networking peer group based on the subscribing viewer's shared interests with the current members of the social networking peer group. For example, the subscriber profile module 200 may determine that a subscribing viewer is interested in similar program content as the current members of a particular social networking peer group based on the subscriber profile information provided by the subscribing viewer. Accordingly, the subscriber profile module 200 place the subscribing viewer in the appropriate social networking peer group based on shared interests in program content. In another embodiment, the subscriber profile module 200 may place a subscribing viewer in a particular social networking peer group based on the subscribing viewer's geographic location, hobbies, occupation, or any other characteristic that indicates common interests between subscribers. In another embodiment, the subscriber profile module 200 may allow a subscribing viewer to select which, if any, social networking peer groups to be placed.

The output module 208 may include computer-implemented software, hardware, or a combination of both, configured to output program content to display devices (e.g., televisions, monitors) of subscriber systems. In one embodiment, the output module 208 may output program content as a series of frames of program content. Each frame in a series may contain a plurality of images that are selectable (e.g., available to be voted for or voted against). For example, the output module 208 may be configured to detect characters and objects in each frame. This configuration may be performed automatically (e.g., by object recognition software) or manually (e.g., by a technician demarcating image boundaries). In some embodiments, a combination of techniques may be used. Accordingly, the output module 208 may configure the detected characters and objects to be selectable by a user input device (e.g., a remote control). In another embodiment, the output module 208 may configure a character or object to be selectable in response to a subscriber selecting the character or object using a user input device (e.g., a remote control).

The subscriber input module 202 may include computer-implemented software, hardware, or a combination of both, configured to receive any, or a combination, of voting data, comment data, and opt-out data, from a subscriber viewing program content. In one embodiment, a subscriber may input voting data by pointing a user input device toward a character or object (e.g., a selectable character or object) displayed in the program content and voting for or voting against the character or object by activating (e.g., clicking on) one or more voting buttons on a user input device (e.g., a remote control). A vote for a character or object displayed in the program content may indicate that the subscriber likes the character or object. A vote against a character or object displayed in the program content may indicate that the subscriber dislikes the character or object. For example, a first subscriber watching first program content (e.g., an episode of Friends) may vote against a first character (e.g., Joey) in the program content using a first input device (e.g., a first remote control). Likewise, a second subscriber that is also watching the first program content (e.g., the episode of Friends) may vote against a second character (e.g., Ross) in the program content using a second input device (e.g., a second remote control). In some embodiments, the subscriber input module 202 may be configured to highlight (e.g., color change, outline) a character or object as an input device (e.g., remote control) is pointing toward the character or object before a vote is inputted.

In another embodiment, a subscriber may input voting data by indicating an overall opinion of the displayed program content. For example, a subscriber may input voting data by indicating that the subscriber likes the displayed program content overall using a user input device (e.g., a remote control). In another example, a subscriber may input voting data by indicating that the subscriber dislikes the displayed program content overall using a user input device (e.g., a remote control).

In another embodiment, a subscriber may input comment data by providing comments about displayed program content using a user input device (e.g., a remote control). Comment data may include one or more comments (e.g., positive comments, negative comments, benign comments) from a subscriber about displayed program content.

In another embodiment, a subscriber may input opt-out data to skip one or more advertisement programs using a user input device (e.g., a remote control). For example, once an advertisement program begins, a subscriber may decide to skip the advertisement program by activating (e.g., clicking on) a button on a remote control.

The subscriber input aggregation module 204 may include computer-implemented software, hardware, or a combination of both, configured to process and aggregate voting data, comment data, or a combination of both, from subscribers viewing the same program content. In one embodiment, the subscriber input aggregation module 204 may aggregate voting data, comment data, or a combination of both, received from subscribers that are members of a common social networking peer group. In another embodiment, the subscriber input aggregation module 204 may aggregate voting data, comment data, or a combination of both, received from any subscriber.

Based on the interactions of one or more subscribers (in a common social networking peer group) with the program content, the subscriber input aggregation module 204 may aggregate one or more votes (e.g., voting data) by calculating one or more subscriber rating statistics. For example, a first subscriber rating statistic may indicate the proportion of subscribers (in a common social networking peer group) that like a character, object, or overall program content. In another example, a second subscriber rating statistic may indicate the proportion of subscribers (in a common social networking peer group) that dislike a character, object, of overall program content.

Based on the interactions of one or more subscribers (in a common social networking peer group) with the program content, the subscriber input aggregation module 204 may also aggregate one or more comments (e.g., comment data) by outputting the comments (from subscribers in a common social networking peer group) to subscribers (in the common social networking peer group). The aggregated data (e.g., voting data, comment data) may be displayed to subscribers (in a common social networking peer group) during the display of the program content using the output module 208.

The advertising module 206 may include computer-implemented software, hardware, or a combination of both, configured to process opt-out data received from a subscriber via a subscriber system (e.g., subscriber systems 106A, 106B, 106N). For example, once an advertisement program begins, a subscriber may generate opt-out data by activating (e.g., clicking on) a button on a remote control to skip the advertisement program. In one embodiment, the advertising module 206 may replace an advertisement program that is skipped with another advertisement program. In such an embodiment, the amount of advertisement programs displayed during a commercial break may be the same amount of advertisement programs scheduled to be displayed during the commercial break. In another embodiment, the advertising module 206 may not replace an advertisement program that is skipped with another advertisement program. In such an embodiment, the amount of advertisement programs displayed during a commercial break may be less than the amount of advertisement programs scheduled to be displayed during the commercial break.

The advertising module 206 may be configured to fill spaces in a commercial break (because of an opt-out) from a live broadcast of program content. In one embodiment, the advertising module 206 may replace a skipped advertisement program with another advertisement program. In another embodiment, the advertising module 206 may replace a skipped advertisement program with program content selected (e.g., pre-selected) by a subscriber.

The advertising module 206 may be configured to track opt-out data inputted by a subscriber. In one embodiment, a subscriber may be uniquely identified based on username data and password data inputted by the subscriber. Based on the identification of a subscriber, the advertising module 206 may track the opt-out data inputted by a particular subscriber. The advertising module 206 may use the tracked opt-out data to determine which advertising programs to display to a subscriber. For example, the advertising module 206 may receive and track opt-out data that indicates a subscriber consistently (e.g., a particular number of times based on a threshold) opts-out of watching advertising programs advertising children's toys. Based on the opt-out data received and tracked, the advertising module 206 may determine to limit or replace advertising programs advertising children's toys.

In certain embodiments, the advertising module 206 may charge a subscriber an opt-out fee (e.g., a micropayment) for each advertisement program that is skipped. In other embodiments, the advertising module 206 may charge a subscriber a monthly opt-out fee to allow a subscriber to opt-out of receiving advertisement programs on a monthly basis.

The subscriber voting interaction system 102 may provide the data associated with any interactions with program content (e.g., voting data, comment data, opt-out data) to the providers of the program content via content provider systems (e.g., content provider systems 108A, 108B, 108N). For example, the subscriber voting interaction system 102 may provide the votes and comments associated with particular program content to the providers of the program content via content provider systems (e.g., content provider systems 108A, 108B, 108N). In another example, the subscriber voting interaction system 102 may provide the opt-outs associated with program content (e.g., advertisement programs) to the providers of the program content via content provider systems (e.g., content provider systems 108A, 108B, 108N).

Figure 3:
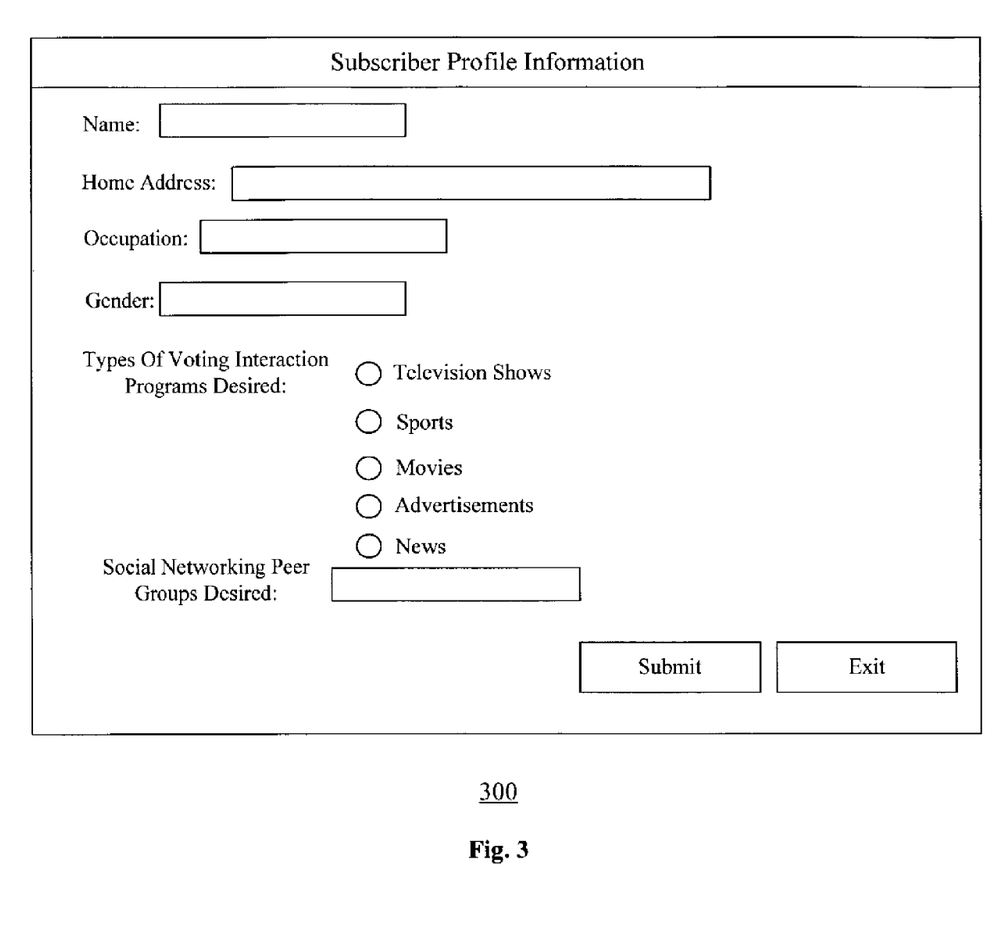
FIG. 3 illustrates an exemplary screen displaying subscriber profile information according to a particular embodiment.

FIG. 3 illustrates an exemplary screen displaying subscriber profile information according to a particular embodiment. As illustrated in FIG. 3, a viewer may input subscriber profile information into a subscriber profile information graphical user interface 300 displayed on a display device (e.g., television, monitor) coupled to a subscriber system (e.g., subscriber systems 106A, 106B, 106N). Subscriber profile information may include data that indicates any, or a combination, of personal information of the subscribing viewer (e.g., first name, last name, home address, occupation, gender), types of program content in which voting interaction should be enabled (e.g., television programs, advertisement programs, movie programs, sports programs, news programs), and social networking peer groups desired.

In one embodiment, activating each type of program content in which voting interaction should be enabled may lead to another graphical user interface associated with corresponding type. For example, activating "Television Shows" may lead to a television shows graphical user interface that requests additional information about the subscriber's interest in television shows. In another example, activating "Sports" may lead to a sports graphical user interface that requests additional information about the subscriber's interest in sports. In another example, activating "Movies" may lead to a movies graphical user interface that requests additional information about the subscriber's interest in movies. In another example, activating "Advertisements" may lead to an advertisements graphical user interface that requests additional information about the subscriber's interest in advertisements. In yet another example, activating "News" may lead to a news graphical user interface that requests additional information about the subscriber's interest in news.

Once the subscriber has completed inputting subscriber profile information, the subscriber may submit the subscriber profile information by activating (e.g., clicking on) a "Submit" button using a user input device (e.g., a remote control). The subscriber may also exit the subscriber profile information graphical user interface 300 by activating (e.g., clicking on) an "Exit" button using a user input device (e.g., a remote control).

Figure 4:
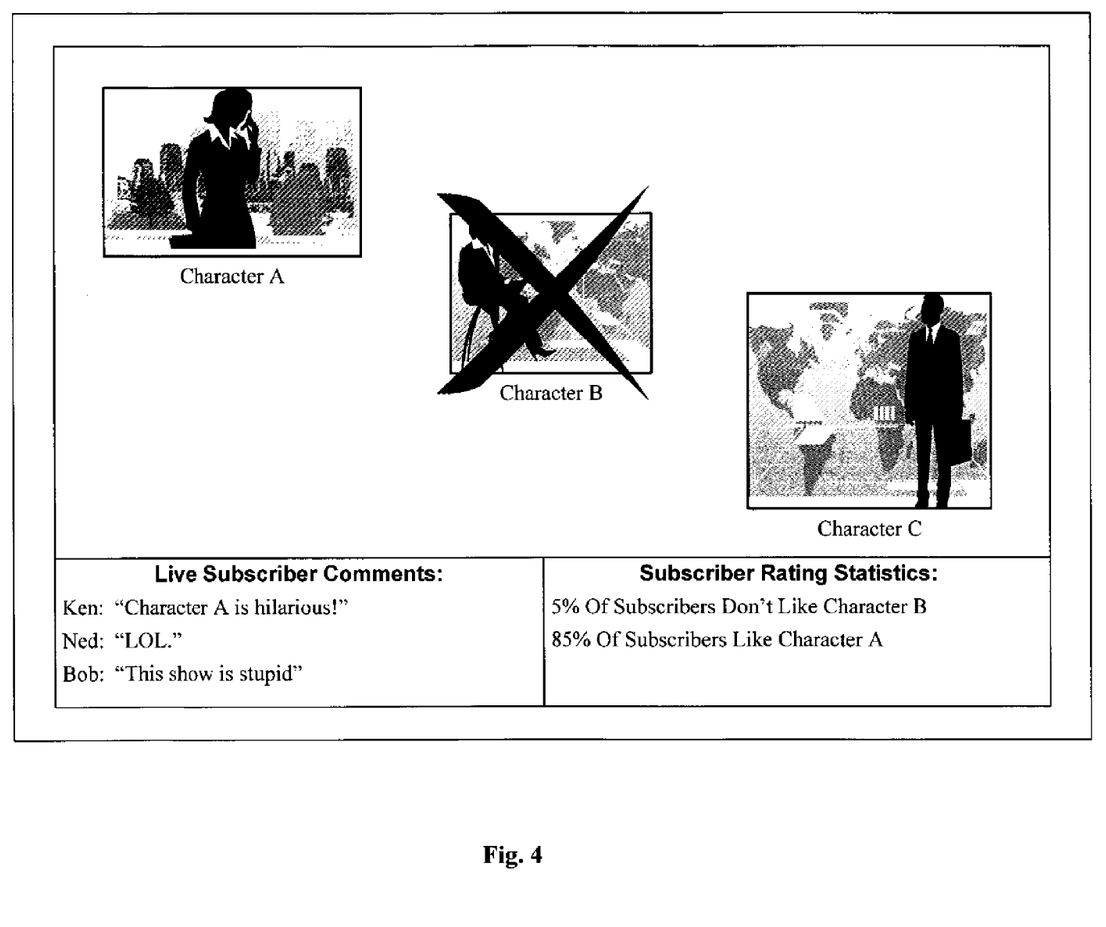
FIG. 4 illustrates an exemplary screen displaying aggregated data according to a particular embodiment.

FIG. 4 illustrates an exemplary screen displaying aggregated data according to a particular embodiment. As illustrated in FIG. 4, the subscriber voting interaction system 102 (or the content provider systems 108A, 108B, 108N) may output program content to a subscriber via a subscriber system. In one embodiment, the program content may include the display of one or more selectable objects or characters (e.g., character A, character B, character C).

Using an input device, a subscriber may vote for or vote against character A, character B, or character C by pointing the user input device toward a character and activating (e.g., clicking on) one or more voting buttons on the user input device. For example, a subscriber may vote against character B by pointing the user input device toward character B and activating (e.g., clicking on) a vote-against button on the user input device. Based on voting data and comment data received, the subscriber voting interaction system 102 may output aggregated data in the form of one or more comments from one or more subscribers (in a common social networking peer group) that are viewing the program content and one or more subscriber rating statistics.

For example, the subscriber voting interaction system 102 may output "Character A is hilarious!" from a first subscriber (e.g., Ken), "LOL" from a second subscriber (e.g., Ned), and "This show is stupid" from a third subscriber (e.g., Bob) during the display of the program content. In another example, the subscriber voting interaction system 102 may output a first subscriber rating statistic that indicates that 5% of subscribers do not like character B and a second subscriber rating statistic that indicates that 85% of subscribers like character A during the display of the program content. The aggregated data displayed may be continuously updated as additional voting data and comment data is received, processed, and aggregated.

Figure 5:
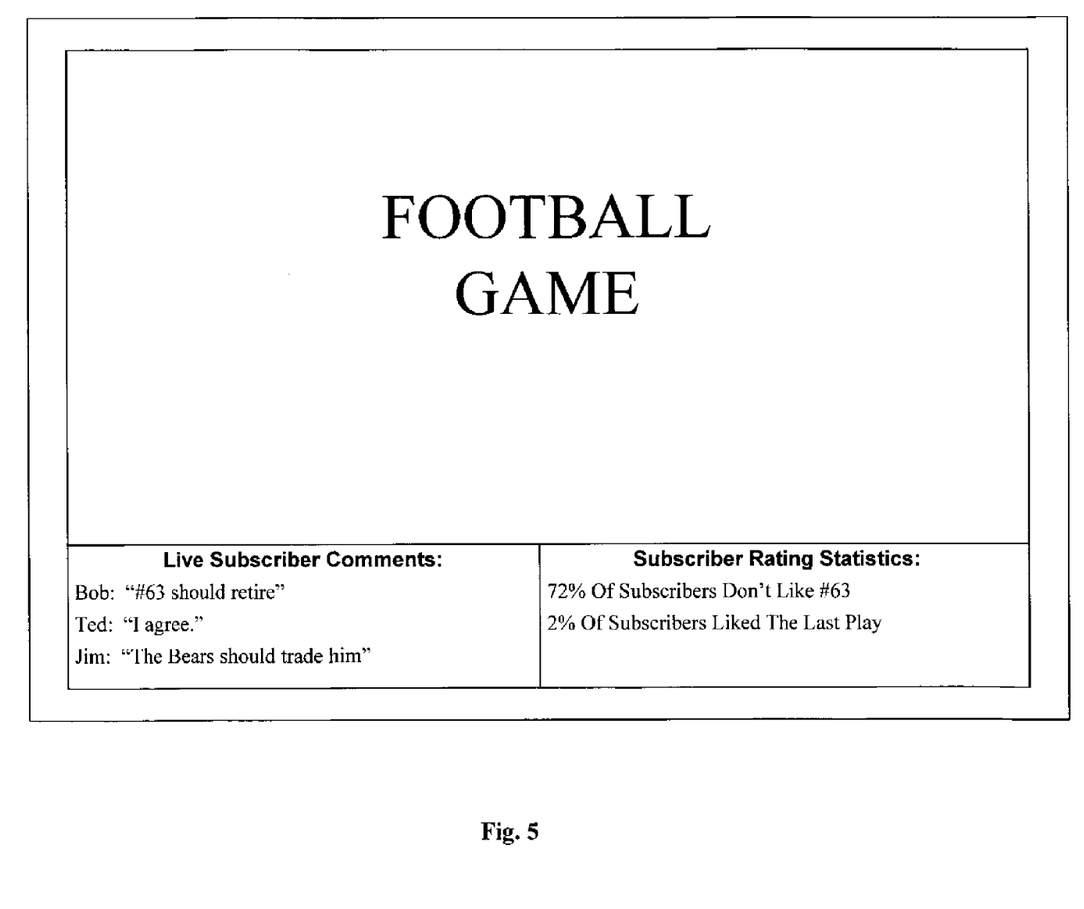
FIG. 5 illustrates an exemplary screen displaying additional aggregated data according to a particular embodiment.

FIG. 5 illustrates an exemplary screen displaying additional aggregated data according to a particular embodiment. As illustrated in FIG. 5, the subscriber voting interaction system 102 (or the content provider systems 108A, 108B, 108N) may output program content to a subscriber via a subscriber system. In one embodiment, the program content may include the display of one or more selectable objects or characters (e.g., football players) playing in a football game.

Using an input device, a subscriber may vote for or vote against a football player by pointing the user input device toward a football player and activating (e.g., clicking on) one or more voting buttons on the user input device. For example, a subscriber may vote against a football player (e.g., #63) by pointing the user input device toward the football player and activating (e.g., clicking on) a vote-against button on the user input device. Based on voting data and comment data received, the subscriber voting interaction system 102 may output aggregated data in the form of one or more comments from one or more subscribers (in a common social networking peer group) that are viewing the football game and one or more subscriber rating statistics.

For example, the subscriber voting interaction system 102 may output "#63 should retire" from a first subscriber (e.g., Bob), "I agree." from a second subscriber (e.g., Ted), and "The Bears should trade him" from a third subscriber (e.g., Jim) during the display of the football game. In another example, the subscriber voting interaction system 102 may output a first subscriber rating statistic that indicates that 72% of subscribers do not like #63 and a second subscriber rating statistic that indicates that 2% of subscribers liked the last play during the display of the football game. The aggregated data displayed may be continuously updated as additional voting data and comment data is received, processed, and aggregated.

Figure 6:
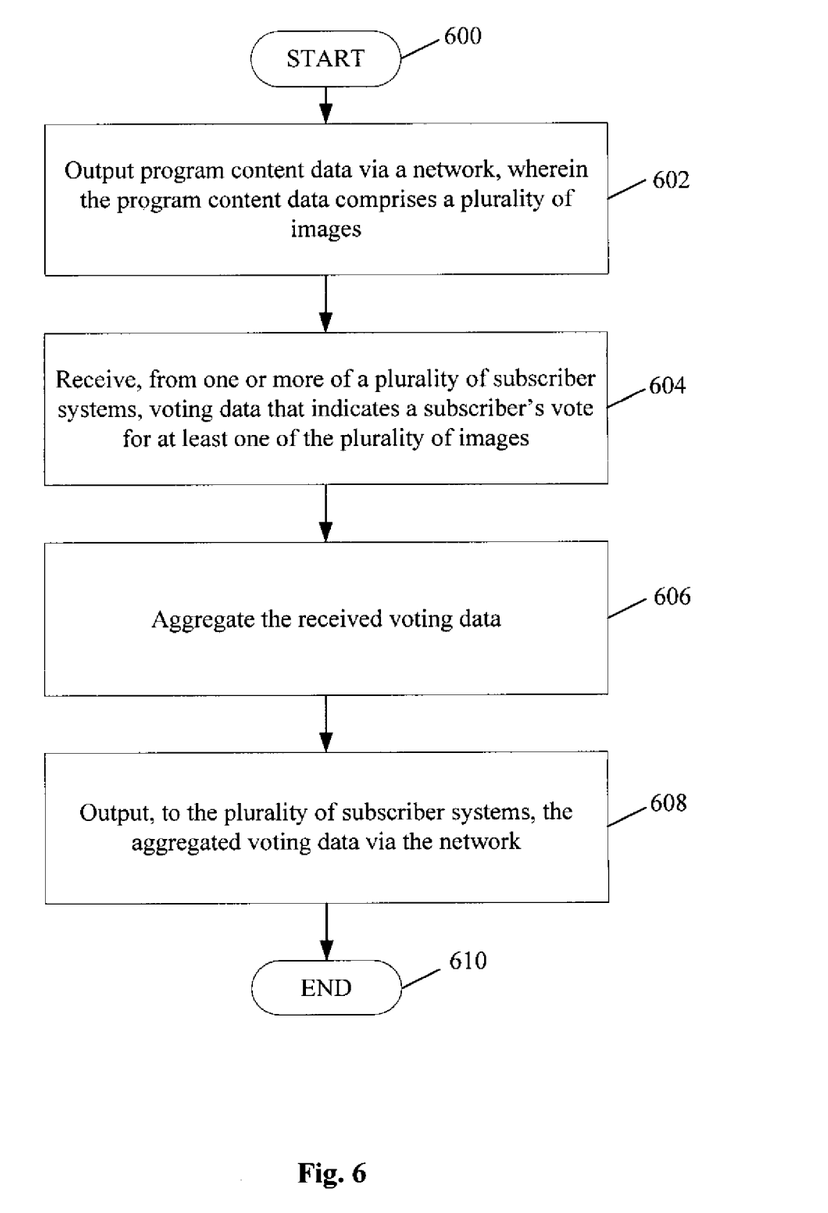
FIG. 6 is a flowchart illustrating the functionality of a particular embodiment.

FIG. 6 is a flowchart illustrating the functionality of a particular embodiment. This exemplary method is provided by way of example, as there are a variety of ways to carry out methods disclosed herein. The method shown in FIG. 6 may be executed or otherwise performed by one or a combination of various systems. The method is described below as carried out by the subscriber voting interaction system 102 shown in FIG. 1 by way of example, and various elements of the subscriber voting interaction system 102 are referenced in explaining the example method. Each block shown in FIG. 6 represents one or more processes, methods, or subroutines carried out in the exemplary method. Referring to FIG. 6, the exemplary method may begin at block 600.

In block 602, the method may include outputting program content data via a network, wherein the program content data comprises a plurality of images. In one embodiment, the output module 208 of the subscriber voting interaction system 102 may output program content data via a network (e.g., data network 104), wherein the program content data comprises a plurality of images. The method may continue to block 604.

In block 604, the method may include receiving, from one or more of a plurality of subscriber systems, voting data that indicates a subscriber's vote for at least one of the plurality of images. In one embodiment, the subscriber input module 202 of the subscriber voting interaction system 102 may receive, from one or more of a plurality of subscriber systems (e.g., subscriber systems 106A, 106B, 106N), voting data that indicates a subscriber's vote for at least one of the plurality of images. The method may continue to block 606.

In block 606, the method may include aggregating the received voting data. In one embodiment, the subscriber input aggregation module 204 of the subscriber voting interaction system 102 may aggregate the received voting data. The method may continue to block 608.

In block 608, the method may include outputting, to the plurality of subscriber systems, the aggregated voting data via the network. In one embodiment, the output module 208 of the subscriber voting interaction system 102 may output, to the plurality of subscriber systems (e.g., subscriber systems 106A, 106B, 106N), the aggregated voting data via the network (e.g., data network 104). The method may then end at block 610.

The description above describes systems and networks that may include one or more modules, some of which are explicitly shown in the figures. As used herein, the term "module" may be understood to refer to any, or a combination, of computer executable computing software, firmware, and hardware. It is noted that the modules are exemplary. The modules may be combined, integrated, separated, or duplicated to support various applications. Also, a function described herein as being performed at a particular module may be performed at one or more other modules or by one or more other devices instead of or in addition to the function performed at the particular module. Further, the modules may be implemented across multiple devices or other components local or remote to one another. Additionally, the modules may be moved from one device and added to another device, or may be included in multiple devices.

It is further noted that the software described herein may be tangibly embodied in one or more physical media, such as, but not limited to any, or a combination, of a compact disc (CD), a digital versatile disc (DVD), a floppy disk, a hard drive, read only memory (ROM), random access memory (RAM), and other physical media capable of storing software. Moreover, the figures illustrate various components (e.g., systems, networks) separately. The functions described as being performed at various components may be performed at other components, and the various components may be combined or separated. Other modifications also may be made.

In the preceding specification, various preferred embodiments have been described with references to the accompanying drawings. It will, however, be evident that various modifications and changes may be made thereto, and additional embodiments may be implemented, without departing from the broader scope of invention as set forth in the claims that follow. The specification and drawings are accordingly to be regarded in an illustrative rather than restrictive sense.

We claim:

1. A system, comprising:
    an output computing apparatus to output program content data via a network, wherein the program content data comprises a plurality of images, wherein each of the plurality of images is selectable, wherein the plurality of selectable images comprise a plurality of selectable characters associated with the program content data, wherein the plurality of selectable characters become selectable in response to a user input device being pointed toward at least one of the plurality of selectable characters, wherein the program content data is part of a live broadcast;
    a subscriber input computing apparatus to receive, from one or more of a plurality of subscriber systems, voting data that indicates a subscriber's vote for at least one of the plurality of images and further configured to receive, from one or more of the plurality of subscriber systems, comment data related to the program content data during the live broadcast, wherein the subscriber is part of a plurality of subscribers;
    a subscriber input aggregation computing apparatus to aggregate the received voting data and the received comment data;
    the output computing apparatus to output, to the one or more of the plurality of subscriber systems, the aggregated voting data and the aggregated comment data via the network during the live broadcast, wherein each subscriber of the plurality of subscribers are placed in at least one of a plurality of social networking peer groups based on similarities between at least one of each subscriber's voting data and voting data associated with one or more other members in the at least one of the plurality of social networking peer groups, each subscriber's comment data and comment data associated with one or more members in the at least one of the plurality of social networking peer groups, and interest data associated with each subscriber and interest data associated with one or more members in the at least one of the plurality of social networking peer groups; and
    an advertising computing apparatus that outputs advertising content data, associated with the program content data, over the network and receives, from the user input device, one of a request to skip and a request to view the advertising content data, wherein, if the advertising computing apparatus receives the request to skip the advertising content data, the advertising computing apparatus provides second advertising content data that is at least one of a same length as the advertising content data and selected by the subscriber.

2. The system of claim 1, wherein the program content data comprises at least one of a television program, an advertisement video, a movie video, a sports video, and a news video.

3. The system of claim 1, further comprising a subscriber profile computing apparatus to register a plurality of subscribers associated with the plurality of subscriber systems.

4. The system of claim 1, wherein the subscriber's vote indicates an opinion of the subscriber of the at least one of the plurality of images.

5. The system of claim 1, wherein the aggregated comment data and the aggregated voting data are outputted simultaneously.

6. The system of claim 1, wherein, if the advertising computing apparatus receives the request to skip the advertising content data, the advertising computing apparatus charges an opt-out fee to the subscriber.

7. The system of claim 1, wherein the second advertising content data is a same length as the advertising content data.

8. The system of claim 1, wherein the second advertising content data is selected by the subscriber.

9. A method, comprising:
    outputting program content data via a network, wherein the program content data comprises a plurality of images, wherein each of the plurality of images is selectable, wherein the plurality of selectable images comprise a plurality of selectable characters associated with the program content data, wherein the plurality of selectable characters become selectable in response to a user input device being pointed toward at least one of the plurality of selectable characters, wherein the program content data is part of a live broadcast;

receiving, from one or more of a plurality of subscriber systems, voting data that indicates a subscriber's vote for at least one of the plurality of images, wherein the subscriber is part of a plurality of subscribers;

aggregating the received voting data;

outputting, to the one or more of the plurality of subscriber systems, the aggregated voting data via the network;

receiving, from the one or more of the plurality of subscriber systems during the live broadcast, comment data related to the program content data;

aggregating the comment data;

outputting, to the one or more of the plurality of subscriber systems, the aggregated comment data via the network during the live broadcast, wherein each subscriber of the plurality of subscribers are placed in at least one of a plurality of social networking peer groups based on similarities between at least one of each subscriber's voting data and voting data associated with one or more other members in the at least one of the plurality of social networking peer groups, each subscriber's comment data and comment data associated with one or more members in the at least one of the plurality of social networking peer groups, and interest data associated with each subscriber and interest data associated with one or more members in the at least one of the plurality of social networking peer group;

outputting advertising content data, associated with the program content data, over the network;

receiving, from the user input device, one of a request to skip the advertising content data and a request to view the advertising content data; and in response to receiving the request to skip the advertising content data, outputting a second advertising content data over the network that is at least one of a same length as the advertising content data and selected by the subscriber.

10. The method of claim 9, wherein the program content data comprises at least one of a television program, an advertisement video, a movie video, a sports video, and a news video.

11. The method of claim 9, further comprising registering a plurality of subscribers associated with the plurality of subscriber systems.

12. The method of claim 9, wherein the subscriber's vote indicates an opinion of the subscriber of the at least one of the plurality of images.

13. The method of claim 9, wherein the aggregated voting data indicates one or more subscriber rating statistics.

14. The method of claim 13, wherein one of the one or more subscriber rating statistics indicates a proportion of a plurality of subscribers that like a character associated with the program content data.

15. The method of claim 13, wherein one of the one or more subscriber rating statistics indicates a proportion of a plurality of subscribers that like the program content data.

16. A non-transitory computer readable media comprising code to perform the acts of the method of claim 9.

17. The method of claim 9, wherein the aggregated comment data and the aggregated voting data are outputted simultaneously.

18. The method of claim 9, further comprising:
charging a subscriber associated with the user input device an opt-out fee in response to receiving the request to skip the advertising content data.

19. The method of claim 9, wherein the second advertising content data is a same length as the advertising content data.

20. The method of claim 9, wherein the second advertising content data is selected by the subscriber.

* * * * *